United States Patent
Kanneganti (10) Patent No.: US 10,815,776 B2
(45) Date of Patent: Oct. 27, 2020

(54) SYSTEMS AND METHODS FOR PERFORMING HYDRAULIC FRACTURING IN VERTICALLY HETEROGENOUS REGIONS

(71) Applicant: SCHLUMBERGER TECHNOLOGY CORPORATION, Sugar Land, TX (US)

(72) Inventor: Kousic Theja Kanneganti, East Ahmadi (KW)

(73) Assignee: Schlumberger Technology Corporation, Sugar Land, TX (US)

( * ) Notice: Subject to any disclaimer, the term of this patent is extended or adjusted under 35 U.S.C. 154(b) by 305 days.

(21) Appl. No.: 15/761,307

(22) PCT Filed: Sep. 16, 2016

(86) PCT No.: PCT/US2016/052412
§ 371 (c)(1),
(2) Date: Mar. 19, 2018

(87) PCT Pub. No.: WO2017/049262
PCT Pub. Date: Mar. 23, 2017

(65) Prior Publication Data
US 2018/0266244 A1    Sep. 20, 2018

Related U.S. Application Data

(60) Provisional application No. 62/220,557, filed on Sep. 18, 2015.

(51) Int. Cl.
*E21B 49/00*    (2006.01)
*E21B 43/26*    (2006.01)
(Continued)

(52) U.S. Cl.
CPC .......... *E21B 49/00* (2013.01); *E21B 41/0092* (2013.01); *E21B 43/26* (2013.01);
(Continued)

(58) Field of Classification Search
CPC .... E21B 49/00; E21B 43/114; E21B 41/0092; E21B 43/26; G01V 1/306;
(Continued)

(56) References Cited

U.S. PATENT DOCUMENTS 9,784,090 B2    10/2017    Baria et al.
2004/0176911 A1   9/2004    Bratton et al.
(Continued)

FOREIGN PATENT DOCUMENTS

WO    2014140752 A1    9/2014

OTHER PUBLICATIONS

Wigger et al., "Logging Solutions for Completion Optimization in Unconventional Resource Plays", Society of Petroleum Engineers, SPE 167726, SPE/EAGE European Unconventional Conference and Exhibition, Feb. 25-27, 2014, 17 pages.
(Continued)

*Primary Examiner* — Michael R Wills, III
(74) *Attorney, Agent, or Firm* — Rodney Warfford (57) ABSTRACT

A hydraulic fracturing system includes a perforating tool configured to perforate a casing of a well and a computing system communicatively coupled to the perforating tool. The computing system is configured to determine a plurality of geomechanical properties associated with a plurality of depths of the well and associated with a subterranean region adjacent to the well based on seismic data representative of the subterranean region; determine stress regime of each of the plurality of depths based on the plurality of geomechanical properties; classify at least one continuous interval of the plurality of depths as a critical net pay (CNP) region based (Continued)

on the stress regime of each depth of the at least one continuous interval; and send a command to the perforating tool to perforate the casing of the well at a depth associated with the CNP region within the at least one continuous interval.

20 Claims, 6 Drawing Sheets

(51) Int. Cl.
    *E21B 41/00*     (2006.01)
    *G01V 1/30*     (2006.01)
    *G01V 1/50*     (2006.01)

(52) U.S. Cl.
    CPC ............... *G01V 1/306* (2013.01); *G01V 1/50* (2013.01); *G01V 2210/1234* (2013.01); *G01V 2210/1299* (2013.01); *G01V 2210/646* (2013.01)

(58) Field of Classification Search
    CPC ............. G01V 2210/1234; G01V 1/50; G01V 2210/646; G01V 2210/1299
    See application file for complete search history.

(56) References Cited

U.S. PATENT DOCUMENTS

| | | |
|---|---|---|
| 2009/0242198 A1 | 10/2009 | Evans et al. |
| 2009/0250211 A1 | 10/2009 | Graig |
| 2010/0101790 A1 | 4/2010 | Hansen et al. |
| 2011/0182144 A1 | 7/2011 | Gray |
| 2013/0032350 A1 | 2/2013 | Potapenko et al. |
| 2013/0206475 A1 | 8/2013 | Prioul et al. |
| 2013/0233537 A1* | 9/2013 | McEwen-King ....... E21B 49/00 166/250.1 |
| 2014/0069653 A1 | 3/2014 | Liu et al. |
| 2017/0075006 A1* | 3/2017 | Dusterhoft ............. G01V 1/303 |
| 2018/0187521 A1* | 7/2018 | Surjaatmadja .......... E21B 43/26 |

OTHER PUBLICATIONS

International Search Report and Written Opinion issued in International Patent Appl. No. PCT/US2016/052412 dated Dec. 26, 2016; 10 pages.

International Search Report and Written Opinion issued in International Patent Appl. No. PCT/US2015/066546 dated Apr. 1, 2016; 14 pages.

\* cited by examiner

| Depth, ft | Overbuden Stress, psi | Minimum Horizontal Stress, psi | Maximum Horizontal Stress, psi | CQ Class | Critical Net Pay |
|---|---|---|---|---|---|
| 8,745 | 8,428 | 9,284 | 12,527 | 3 | 0 |
| 8,746 | 8,428 | 9,344 | 12,619 | 3 | 0 |
| 8,747 | 8,429 | 9,064 | 12,091 | 3 | 0 |
| 8,748 | 8,430 | 7,080 | 8,796 | 2 | 9 |
| 8,749 | 8,430 | 6,884 | 7,834 | 1 | 8 |
| 8,750 | 8,431 | 7,926 | 8,806 | 2 | 7 |
| 8,751 | 8,432 | 7,813 | 8,713 | 2 | 6 |
| 8,752 | 8,432 | 7,450 | 8,333 | 1 | 5 |
| 8,753 | 8,433 | 7,810 | 8,748 | 2 | 4 |
| 8,754 | 8,434 | 7,604 | 8,541 | 2 | 3 |
| 8,755 | 8,434 | 7,591 | 8,528 | 2 | 2 |
| 8,756 | 8,435 | 7,835 | 9,089 | 2 | 1 |
| 8,757 | 8,435 | 8,975 | 11,406 | 3 | 0 |
| 8,758 | 8,436 | 9,698 | 12,699 | 3 | 0 |
| 8,759 | 8,437 | 8,473 | 10,402 | 3 | 0 |
| 8,760 | 8,437 | 7,099 | 8,219 | 1 | 2 |
| 8,761 | 8,438 | 8,222 | 9,545 | 2 | 1 |
| 8,762 | 8,439 | 8,638 | 10,759 | 3 | 0 |
| 8,763 | 8,439 | 9,341 | 12,231 | 3 | 0 |
| 8,764 | 8,440 | 8,908 | 11,519 | 3 | 0 |
| 8,765 | 8,441 | 7,754 | 9,365 | 2 | 5 |
| 8,766 | 8,441 | 7,842 | 9,356 | 2 | 4 |
| 8,767 | 8,442 | 8,309 | 10,204 | 2 | 3 |
| 8,768 | 8,442 | 8,349 | 10,266 | 2 | 2 |
| 8,769 | 8,443 | 8,357 | 10,321 | 2 | 1 |
| 8,770 | 8,444 | 8,553 | 10,708 | 3 | 0 |
| 8,771 | 8,444 | 8,448 | 10,887 | 3 | 0 |

| CQ Class | ID |
|---|---|
| Class 3 | 3 |
| Class 2 | 2 |
| Class 1 | 1 |

| N | 3 |
|---|---|
| n | 2 |

| Cutoff | 2.67 |
|---|---|

SYSTEMS AND METHODS FOR PERFORMING HYDRAULIC FRACTURING IN VERTICALLY HETEROGENOUS REGIONS

CROSS REFERENCE TO RELATED APPLICATIONS

This application is a Non-Provisional of U.S. Provisional Patent Application No. 62/220,557, entitled "Workflow to Optimize Staging and Completion Design in Tectonically Active Areas to Enable Hydraulic Fracturing," filed Sep. 18, 2015, which is herein incorporated by reference in its entirety.

BACKGROUND

The present disclosure relates generally to systems and methods for improving production characteristics of a hydrocarbon well at a wellsite. More specifically, the present disclosure is related to systems and methods for identifying regions of within a borehole to perforate and enhance vertical connectivity of a corresponding hydraulic fracture.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Production of hydrocarbons from subterranean formations presents a myriad of challenges. One such challenge is the lack of permeability in certain formations. Often hydrocarbon-bearing formations that may contain large quantities of hydrocarbons do not produce at a desirable production rate due to certain properties (e.g., vertical connectivity of reservoir, permeability). These properties may cause the flow rate of the sought-after hydrocarbons to decrease. To increase the flow rate, a stimulation treatment, such as hydraulic fracturing, can be performed.

Hydraulic fracturing is a process whereby a subterranean hydrocarbon reservoir is stimulated to increase the permeability of the formation, thereby increasing the flow of hydrocarbons from the reservoir. Hydraulic fracturing includes pumping a fracturing fluid at a high pressure (e.g., in excess of 10,000 psi) to crack the formation and create larger passageways for hydrocarbon flow. To provide this fracturing fluid to a subterranean area via a borehole, wells are perforated and the fracturing fluid is pumped via the perforations to facilitate production of hydrocarbons (e.g., oil, gas). Perforation techniques may involve the use of shaped charges or the use of high-pressure jets to create perforations through surrounding casing and into the formation. Although the perforation of a well may assist in improving the production of the well, it has been observed that in heterogeneous subterranean regions having a variety of different stress regions throughout the depth of the borehole that may result in different hydrocarbon production properties depending on the different stress properties.

SUMMARY

This summary is provided to introduce a selection of concepts that are further described below in the detailed description. This summary is not intended to identify key or essential features of the subject matter described herein, nor is it intended to be used as an aid in limiting the scope of the subject matter described herein. Indeed, this disclosure may encompass a variety of aspects that may not be set forth below.

In one embodiment, a hydraulic fracturing system may include a perforating tool configured to perforate a casing of a well and a computing system communicatively coupled to the perforating tool. The computing system may be configured to determine a plurality of geomechanical properties associated with a plurality of depths of the well and associated with a subterranean region adjacent to the well based on seismic data representative of the subterranean region; determine stress regime of each of the plurality of depths based on the plurality of geomechanical properties; classify at least one continuous interval of the plurality of depths as a critical net pay (CNP) region based on the stress regime of each depth of the at least one continuous interval; and send a command to the perforating tool to perforate the casing of the well at a depth associated with the CNP region within the at least one continuous interval.

In another embodiment, a non-transitory computer-readable medium may include computer-executable instructions that cause a processor to receive seismic data associated with a subterranean formation adjacent to a well configured to produce hydrocarbons; determine a plurality of geomechanical properties associated with a plurality of depths of the well based on the seismic data; categorize each of the plurality of depths into one of three classes based on the plurality of geomechanical properties; classify at least one continuous interval of the plurality of depths as a critical net pay (CNP) region based on whether each depth of the at least one continuous interval is categorized as either one of two of the three classes; and determine a depth within the at least one continuous interval for a perforating tool to perforate a casing of the well.

In yet another example, a method may include receiving, via a processor, seismic data associated with a subterranean formation adjacent to a well configured to produce hydrocarbons; receiving, via a processor, a plurality of geomechanical properties associated with a plurality of depths of the well based on the seismic data; categorizing, via the processor, each of the plurality of depths into one of three classes based on the plurality of geomechanical properties; classifying, via the processor, at least one continuous interval of the plurality of depths as a critical net pay (CNP) region based on whether each depth of the at least one continuous interval is categorized as either one of two of the three classes; and sending, via the processor, a command to a perforating tool to perforate a casing of the well at a depth within the at least one continuous interval.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

To improve the efficiency in which the well produces hydrocarbons, it may be useful to identify certain depths of the borehole where perforations may result in a higher yield of hydrocarbon production at the well. As mentioned above, perforating a borehole at certain depths may improve the production of the corresponding well system. Generally, a process for determining staging and completion design for well stimulation involves identifying depths to perforate a well based on reservoir quality (RQ) data and completion quality (CQ) data. Completion quality data provides an indication with regard to the effectiveness of a hydraulic fracture produced in the well with regard to connecting a corresponding hydrocarbon reservoir to the well. Completion quality data may thus be determined based on a number of variables include, for example, stress, anisotropy, Young's modulus, Poisson's ratio, natural fractures, stress regime, and the like.

In certain environments, perforations may be performed within the borehole at depths that correspond to subterranean regions having the lowest relative stress values within the borehole. That is, vertical stress contrast properties of the subterranean region may directly correlate to vertical connectivity properties of a single hydraulic fracture. As such, to improve the vertical connectively of a hydraulic fracture of a well to a hydrocarbon reservoir within a corresponding subterranean region, perforations may be performed within the well at depths where the subterranean region has the lowest relative stress regime. However, it has been observed that the direct correlation between the lowest relative stress regime of a borehole and vertical connectivity of a corresponding hydraulic fracture may not hold true in subterranean regions that are not in a normal stress regime. In other words, in subterranean regions where a horizontal stress is the least stress value as compared to the vertical stress (e.g., normal stress regime), the direct correlation between the lowest relative stress regime of a borehole and vertical connectivity of a corresponding hydraulic fracture may hold true, while the same correlation may not hold true in other subterranean regions (e.g., active tectonic regions) that are not in the normal stress regime.

For instance, in the Middle East and across several other areas around the world where the corresponding subterranean regions are under a compressive environment, vertical stress (e.g., overburden stress), as opposed to one of the two horizontal stresses, can become intermediate or the least of certain principal stresses (e.g., minimum horizontal stress, maximum horizontal stress, vertical stress). In these types of environments, if the overburden stress is exceeded during the fracturing treatment, the resulting fracture may turn to a horizontal direction and thus fail to vertically connect to the hydrocarbon reservoir. In other words, perforating a well at depths that correspond to the lowest horizontal stresses in subterranean regions that are under a compressive environment may result in horizontal fractures that limit the ability of the facture to vertically connect to hydrocarbon reservoirs, thereby decreasing the effectiveness of the well in producing hydrocarbons.

Complexity in geomechanics in certain subterranean regions due to some factors such as the presence of active tectonics may result in a vertically heterogeneous stress profile of the borehole of a well. That is, the borehole may traverse through different stress regimes within the corresponding subterranean region including a normal stress regime, a strike-slip stress regime, and a thrust stress regime. In one embodiment, a computing system may analyze seismic data associated with the subterranean region of the borehole along with other reservoir considerations such as faults, natural fractures, and laminations to categorize the stress regime heterogeneity of the borehole with respect to at least three different completion quality (CQ) classes: CQ class 1, CQ class 2, and CQ class 3. CQ class 1 depths may denote locations where conditions (e.g., stresses) of the subterranean region may lead to the formation of vertical hydraulic fractures. CQ class 2 may denote locations where conditions may lead to the formation of a twist or turn in the hydraulic fracture, whereas CQ class 3 denotes locations where conditions may lead to the formation of hydraulic fracture with a horizontal component.

Based on the classification of completion quality, the computing system may then identify depths within the borehole where perforations may induce the improved vertical connectivity between the hydraulic fractures and a hydrocarbon reservoir. For instance, the computing system may provide for perforations to be performed at depths of the borehole that correspond to continuous CQ class 1 and CQ class 2 regions. In some embodiments, the computing system may then send a command or signal to a perforation tool to subsequently perforate the borehole at the determined depths. As a result, the corresponding well may enhance or improve its production of the hydrocarbons. Additional details with regard to the systems and methods for improving hydrocarbon production of a well based on perforation locations will be discussed below with reference to FIGS. 1-8.

Figure 1:
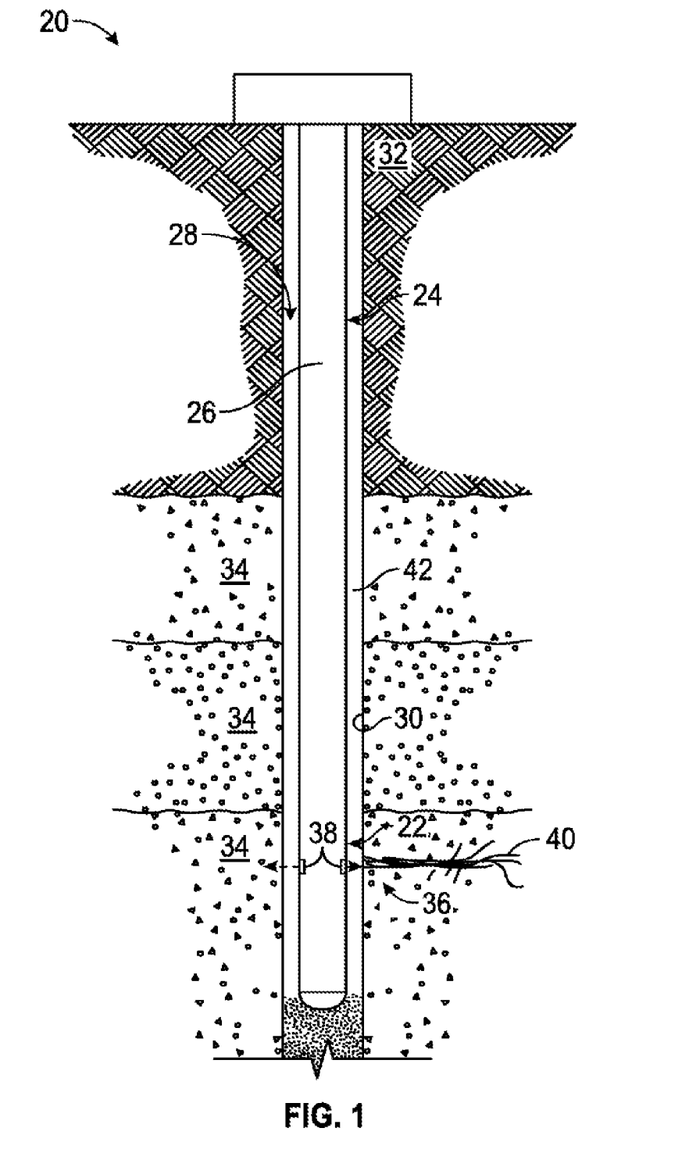
FIG. 1 is a schematic illustration of an example of a well system comprising a jet perforating tool, according to an embodiment of the disclosure.

By way of introduction, FIG. 1 illustrates an example of one type of use case utilizing a perforating string to facilitate perforating and stimulating of a number of well zones. It should be understood that the example provided in FIG. 1 is provided to facilitate explanation of the systems and techniques described herein. However, it should be noted that a variety of perforating systems, stimulation systems, and other well or non-well related systems may utilize the methodology described herein. Moreover, the well string and the jet-perforating tool described herein may comprise a variety of components arranged in various configurations depending on the parameters of a specific perforating/stimulating operation.

Referring now to FIG. 1, a well perforating and stimulating system 20 may include a jet-perforating tool 22 deployed on a tubing string 24, such as a coiled tubing string having coiled tubing 26. The tubing string 24 may include a variety of additional and/or alternate components, depending in part on the specific perforating and stimulating application, the geological characteristics, and the well type. In one embodiment, the tubing string 24 is deployed in a borehole 28 and within a casing 30.

In the illustrated example, the borehole 28 extends down through a subterranean formation 32 having a number of well zones 34. Each of the well zones 34 may be selectively perforated to form a plurality of perforations 36. Additionally, each of the well zones 34 may be stimulated (e.g., fractured) via an appropriate stimulation operation following perforation of the well zone 34. The perforations 36 may be formed by high-pressure jets of fluid discharged through at least one perforating jet nozzle 38 of jet perforating tool 22. In one example, the jet perforating tool 22 may include a number of perforating jet nozzles 38 that direct perforating jets of fluid laterally (e.g., radially) outward through casing 30 and into the formation 32 at the desired well zone 34.

After the casing 30 is perforated, fracturing fluids may be pumped into the perforations to induce the creation of one or more hydraulic fractures 40 within the respective well zone 34. The hydraulic factures 40 may then connect the borehole 28 to a hydrocarbon reservoir, such that the well system 20 may produce hydrocarbons. As mentioned above, in certain parts of the world where the vertical stress profile of the subterranean formation 32 includes a number of different stress regimes or values, the depths in which the perforations are placed may affect the productivity of hydrocarbon production.

Figures 2, 3:
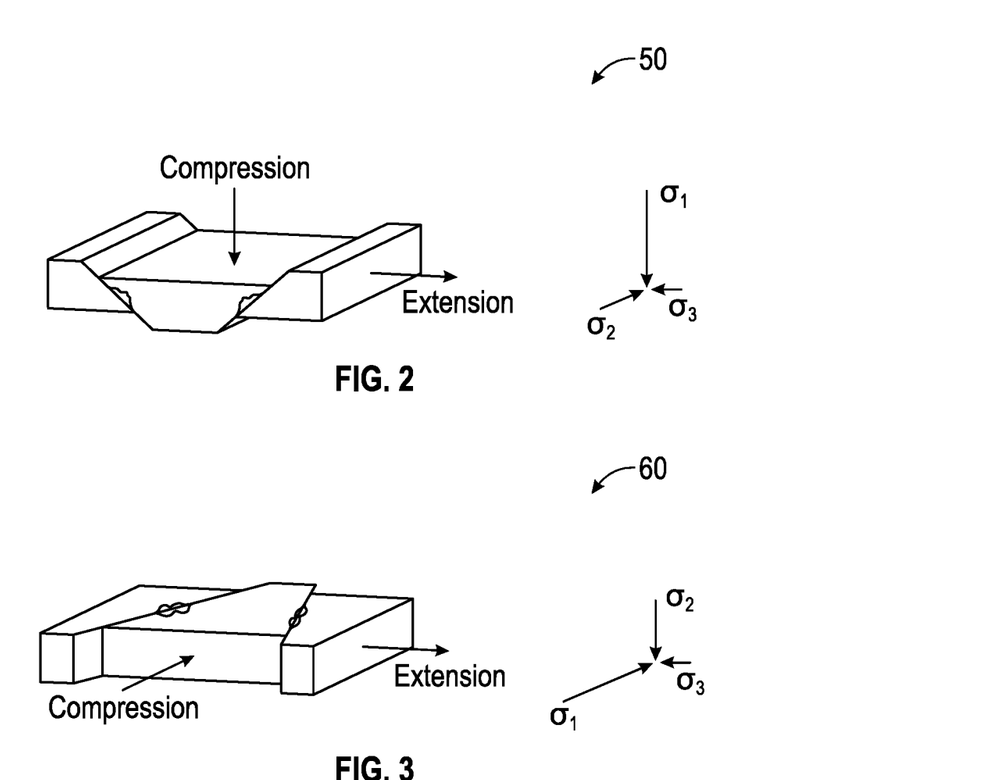
FIG. 2 is a schematic diagram representing a normal stress regime, in accordance with an embodiment.
FIG. 3 is a schematic diagram representing a strike-slip stress regime, in accordance with an embodiment.

For instance, FIG. 2 illustrates a schematic diagram 50 that represents a normal stress regime. In the normal stress regime, one of the horizontal stresses (e.g., minimum horizontal stress or maximum horizontal stress) is the least of the two horizontal stresses and the overburden (e.g., vertical) stress. Moreover, the normal stress regime may also correspond to depths in which the vertical stress value is the largest of the three principal stresses.

However, in tectonically active areas, one of the two horizontal stresses may be larger than the overburden stress while the other of the two horizontal stresses remains to be the lower than the overburden stress. FIG. 2 illustrate a schematic diagram 60 that represents a strike-slip stress regime where the overburden stress is greater that the two horizontal stresses.

Figure 4:
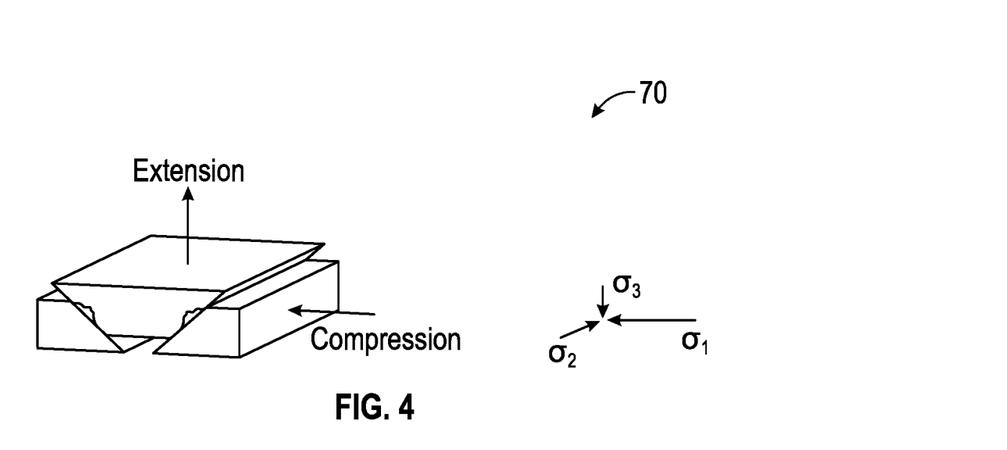
FIG. 4 is a schematic diagram representing a thrust stress regime, in accordance with an embodiment.

In addition to the normal stress regime and the strike-slip stress regime of FIGS. 2 and 3, FIG. 4 illustrates a schematic diagram 70 of a thrust stress regime. The thrust stress regime may provide the least effectiveness in improving hydrocarbon production of a well via hydraulic fractures. That is, in a thrust stress regime, the vertical stress is the smallest value of the three principal stresses. As a result, hydraulic fractures placed in a thrust stress regime may result in horizontal fracturing and inhibiting access to the hydrocarbon reservoir located above and below the hydraulic fracture 40.

With the foregoing in mind, in one embodiment, a computing system may analyze seismic data associated with the subterranean formation 32 associated with the borehole 28 to identify contiguous interval sections (e.g., depths) of the subterranean formation 32 that corresponds to higher reservoir quality and facilitates creation of a vertical hydraulic fracture with as compared to different depths of the borehole 28. The computing system may be any suitable processor-based computer that is capable of executing computer-readable instructions. For example, FIG. 5 illustrates an example computing system 80 that may perform various techniques described herein to perforate certain depths of a borehole 28 to enhance vertical connectivity of hydraulic fractures.

Figure 5:
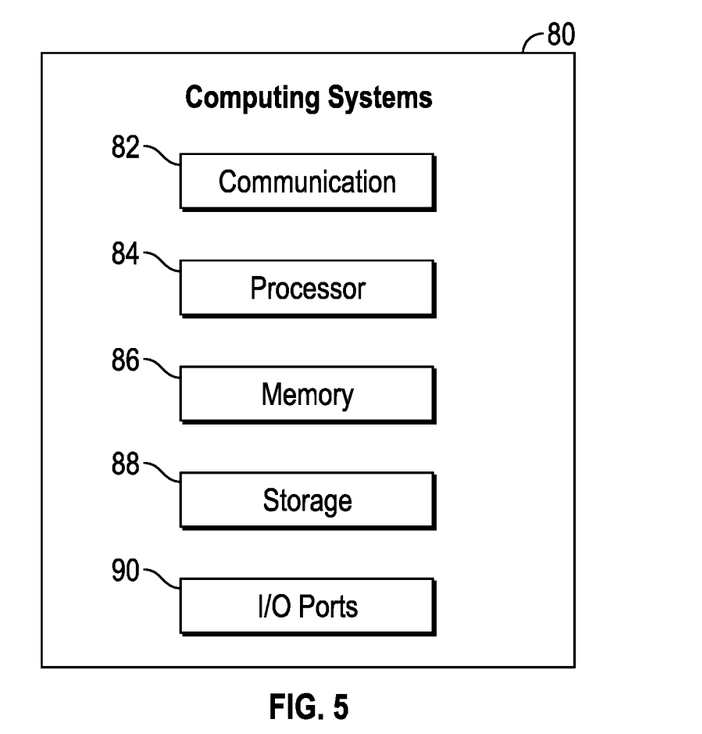
FIG. 5 illustrates a block diagram of a computing system that may perform certain operations for identifying areas within a borehole where perforations may effectively improve the production of the well system of FIG. 1, in accordance with an embodiment.

Referring now to FIG. 5, FIG. 5 illustrates a detailed block diagram of components in the computing system 80 that may be used to perform the techniques described herein. The computing system 80 may include a communication component 82, a processor 84, a memory 86, a storage 88, input/output (I/O) ports 90, and the like. The communication component 82 may be a wireless or wired communication component that may facilitate communication between the sensors disposed in the borehole 28, the jet-perforating tool 22, a remote terminal unit, and the like.

The processor 84 may be any type of computer processor or microprocessor capable of executing computer-executable code. The processor 84 may also include multiple processors that may perform the operations described below. The memory 86 and the storage 88 may be any suitable articles of manufacture that can serve as media to store processor-executable code, data, or the like. These articles of manufacture may represent computer-readable media (i.e., any suitable form of memory or storage) that may store the processor-executable code used by the processor 84 to perform the presently disclosed techniques. The memory 86 and the storage 88 may also be used to store the data, analysis of the data, and the like. The memory 86 and the storage 88 may represent non-transitory computer-readable media (i.e., any suitable form of memory or storage) that may store the processor-executable code used by the processor 84 to perform various techniques described herein. It should be noted that non-transitory merely indicates that the media is tangible and not a signal. The 110 ports 90 may be interfaces that may couple to other I/O devices such as keyboards, mice, or other tools used to interface with the computing system 80.

Returning to the discussion regarding identifying contiguous interval sections (e.g., depths) of the subterranean formation 32 that corresponds to higher reservoir quality as compared to other depths of the subterranean formation 32, the computing system 80 may classify each depth of the borehole as part of CQ class 1, CQ class 2, or CQ class 3. The computing system 80 may then associate a weight to each CQ class (e.g., 1, 2, and 3 for CQ class 1, 2, and 3, respectively) and determine a critical net pay (CNP) cutoff value based on a moving average algorithm using a sample size ("N") for the moving average, a number of CQ classes in the sample size, and a weight of the corresponding CQ class. That is, the computing system 80 may classify each depth of the borehole 28 as part of a critical net pay (CNP) region or not part of the critical net pay (CNP) region based on whether the CQ class value of a respective depth is above or below the CNP cutoff value. Additional details regarding the classification of each depth of the borehole 28 as part of the CNP region will be described below with reference to FIG. 6

Figure 6:
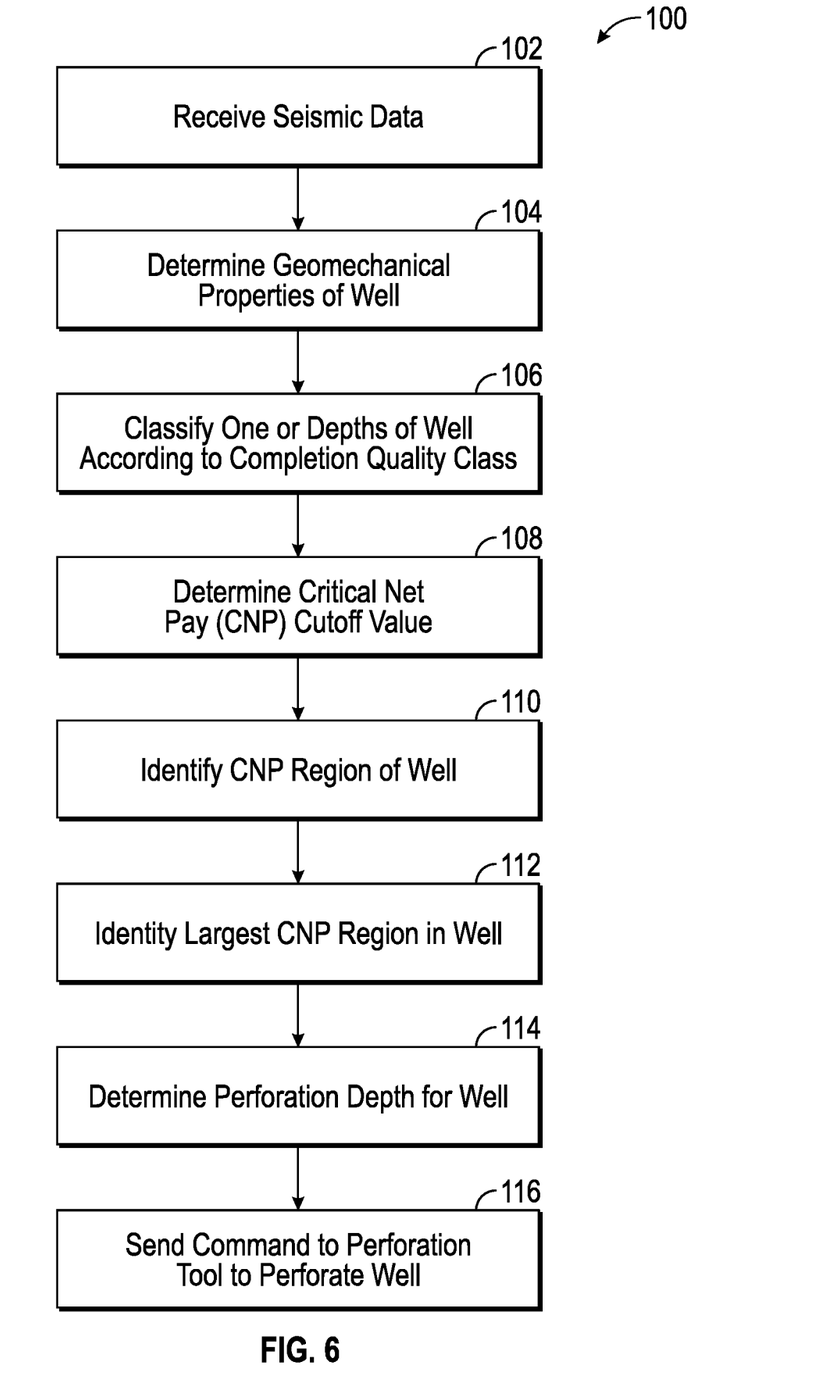
FIG. 6 illustrates a flow chart of a method for identifying a region within a borehole to perforate, in accordance with an embodiment.

FIG. 6 illustrates a method 100 for perforating the borehole 28 at a particular depth based on the stress properties of the borehole 28 at various depths. Although the following description of the method 100 is provided below as being performed by the computing system 80, it should be noted that any suitable processor-enabled device may perform the method 100. Moreover, although the following description of the method 100 is discussed as being performed in a particular order, it should be noted that the method 100 may be performed in any suitable order.

Referring now to FIG. 6, at block 102, the computing system 80 may receive seismic or sonic data regarding the subterranean formation 32. The seismic data may be acquired during a seismic survey, via rock analysis of each well zone 34, or the like.

In any case, after acquiring the seismic data, at block 104, the computing system 80 may determine certain geomechanical properties of each well zone 34 or the rock located at various depths in the subterranean region 32 based on the seismic data. The geomechanical properties may include stress values associated with the rock at various depths within the borehole 28. The stress values may include, for example, an overburden (e.g., vertical) stress, a minimum horizontal stress, and a maximum horizontal stress.

Figure 7:
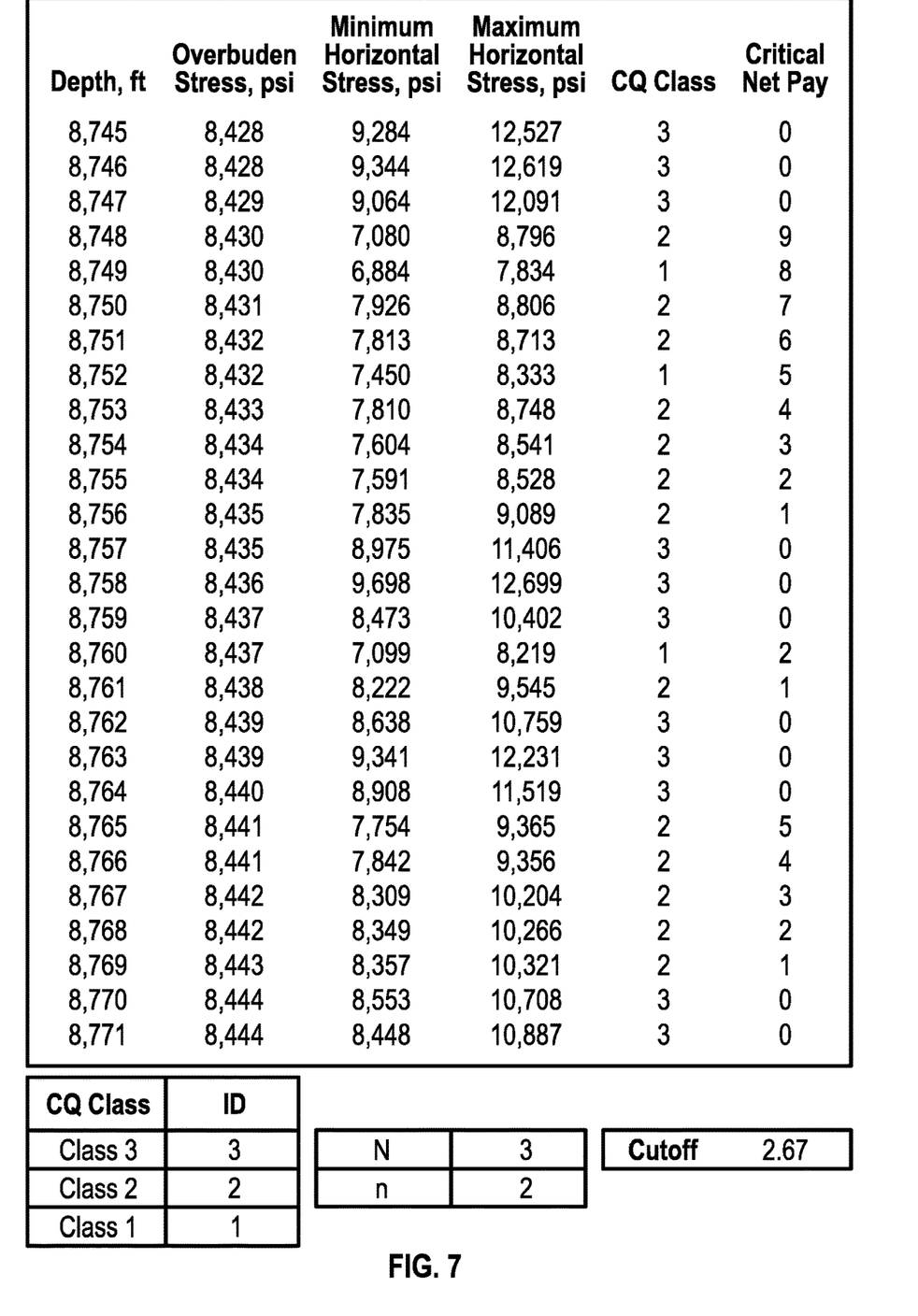
FIG. 7 illustrates a collection of data that provides example stress characteristics of a borehole with respect to depth, in accordance with an embodiment.

At block 106, the computing system 80 may classify each depth of the borehole 28 that seismic data is available as a CQ class 1 region, a CQ class 2 region, or a CQ class 3 region based on the geomechanical properties. For instance, FIG. 7 illustrates a collection of data that include certain geomechanical properties (e.g., stresses) at various depths within the borehole 28. Based on the geomechanical properties at each depth of the borehole 28, the computing system 80 may classify each depth as a CQ class 1 region when the overburden value is the lowest of the three principal stresses; as a CQ class 2 region when one of the horizontal stress values is lower than the overburden value; and as a CQ class 3 region when one of the horizontal stress values is the lowest and the overburden stress value is the highest.

After classifying each depth as a CQ class 1, CQ class 2, or CQ class 3 region (i.e., normal stress regime, strike-slip stress regime, thrust stress regime, respectively), at block 108, the computing system 80 may determine a critical net pay (CNP) cutoff value based on a moving average of weights associated with each CQ class, a sample size for the moving average, and a number of classes in the sample size. The computing system 80 may use the CNP cutoff value to determine whether each depth of the borehole 28 is part of a critical net pay (CNP) region, as will be described in greater detail below.

In one embodiment, the CNP cutoff value may be determined based on the average of $[(N+1/n)*CQ$ Class 3 ID], $[(N-1/n)*CQ$ Class 2 ID], and $[(N-1/n)*CQ$ Class 1 weight], where N is the sample size for a moving average, n is a number of classes that is part of the sample size, and weight is a weighting factor assigned to each respective CQ class. The weight assigned to CQ class 1 may be less than the weight assigned to CQ class 2, and the weight assigned to CQ class 2 may be less than the weight assigned to CQ class 3. When determining the cutoff value, the computing system 80 may evaluate the CQ classification at each depth of the borehole 28 from the bottom up. By way of example, the CNP cutoff value for the collection of data provided in FIG. 7 is 2.67. Although the CNP cutoff value has been described as being determined according to a particular algorithm, it should be noted that the CNP cutoff value may be determined in a number of suitable manners. For instance, the CNP cutoff value may be determined such that desired CQ classes (e.g., CQ class 1 and CQ class 2) are classified as part of the CNP region.

After determining the CNP cutoff value, the computing system 80 may, at block 110, determine whether each depth of the borehole 28 is part of a critical net pay (CNP) region based on the respective CQ class associated with the depth. Looking at the collection of data in FIG. 7 and recalling that the CNP cutoff value is 2.67, each depth associated with a CQ class 3, which is above the CNP cutoff value, will be excluded or "cut off" from being part of a CNP region.

In one embodiment, the computing system 80 may start from the bottom of the borehole 28 or at the lowest depth and determine whether the respective depth is part of a CNP region. For instance, referring to FIG. 7, since depth 8,771 ft. is classified as CQ class 3, which is above the CNP cutoff value, the computing system 80 may assign a zero to the CNP column to indicate that the respective depth is not part of a CNP region.

Moving further up the borehole 28, at depth 8,769 ft., the computing system 80 may increment a CNP counter from 0 to 1 because the respective depth is associated with CQ class 2, which is below the 2.67 cutoff value. Continuing upwards to the next depth of 8,768 ft., the computing system 80 may again increment the CNP counter from 1 to 2 because the respective depth is again associated with CQ class 2, which is below the 2.67 cutoff value. As shown in FIG. 7, the computing system 80 may continue to increment the CNP counter from depth 8,767 ft. to 8,765 ft., such that depth 8,765 ft. is the fifth continuous depth of the borehole 28 that has a CQ class that is below the CNP cutoff value. It should be noted that the computing system 80 may reset the CNP counter at the next higher depth of 8,764 ft. to 0 because the respective depth is associated with CQ class 3.

Figure 8:
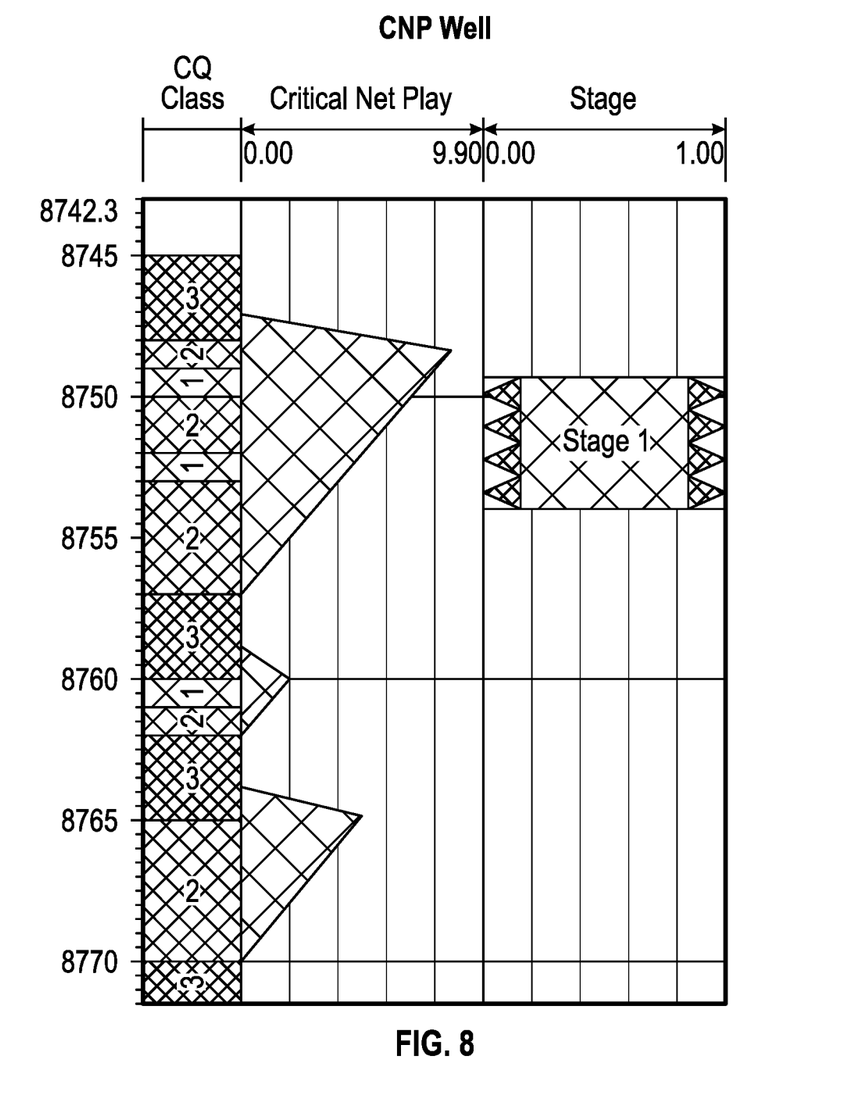
FIG. 8 illustrates a schematic diagram that represents a borehole, various stress regimes within the borehole with respect to depth, and an example location of perforations with respect to the stress regimes, in accordance with an embodiment.

After the computing system 80 has attributed each appropriate depth of the borehole 28 to a CNP region, at block 112, the computing system 80 may identify the CNP region having the most number of depths associated therewith. In one embodiment, the computing system 80 may generate a visualization to indicate the CNP value at each depth of the borehole 28, as shown in FIG. 8.

Based on the identified CNP regions, at block 114, the computing system 80 may determine a depth of the borehole 28 where perforations should be made. That is, after identifying the CNP region having the largest count, for example, the computing system 80 may determine one or more depth values that correspond to approximately the center of the identified CNP region. At block 116, the computing system 80 may send a command to the jet-perforating tool 22 or other suitable device to perforate the casing 30 at the determined depths. Although the foregoing description of the method 100 is described such that the computing system 80 may control the operation of the jet-perforating tool 22 to perforate the casing 30 at the determined depth, it should be noted that the computing system 80 may control any suitable device to perform the same function. Moreover, in some embodiments, the method 100 may end at block 114, such that the computing system 80 may provide information regarding the depths at which perforations should be performed.

With the foregoing in mind, embodiments presented herein provide a workflow for determining a staging and completion design for wells that may be located in geomechanically challenging regions (e.g., having active tectonics). Generally, the embodiments described herein involve associating a number of depths of a well to a CQ class based on geomechanical properties of the subterranean formation 32 at the respective depths. Using the CQ classes for the depths of the wells, the embodiments described herein identify region or continuous depths of the well that has amenable geomechanical properties. That is, in subterranean formations that have highly heterogeneous reservoirs, it may be useful to evaluate the geomechanical properties of a number of depths to identify the depth(s) where completion operations may result in more efficient hydrocarbon yield via the well. It should be noted that the embodiments presented herein are applicable for staging and perforation design in a vertical well, for identifying vertical landing point, for determining well placement strategy for a lateral, and the like.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A hydraulic fracturing system comprising:
    a perforating tool configured to perforate a casing of a well; and
    a computing system communicatively coupled to the perforating tool, wherein the computing system is configured to:
        determine a plurality of geomechanical properties associated with a plurality of depths of the well and associated with a subterranean region adjacent to the well based on seismic data representative of the subterranean region;
        determine a stress regime of each of the plurality of depths based on the plurality of geomechanical properties;
        classify at least one continuous interval of the plurality of depths as a critical net pay (CNP) region based on the stress regime of each depth of the at least one continuous interval; and
        send a command to the perforating tool to perforate the casing of the well at a depth associated with the CNP region within the at least one continuous interval.

2. The hydraulic fracturing system of claim 1, wherein the plurality of geomechanical properties comprise a minimum horizontal stress, a maximum horizontal stress, and an overburden stress.

3. The hydraulic fracturing system of claim 2, wherein the computing system is configured to classify the at least one continuous interval of the plurality of depths by:
    assigning a categorization value to each of the plurality of depths based on whether a respective depth is a normal stress regime, a strike-slip stress regime, or a thrust stress regime;
    determining a cutoff value associated with classifying each of the plurality of depths as part of the at least one continuous interval; and
    classifying each depth of the at least one continuous interval as part of the at least one continuous interval when a respective categorization value of each depth of the at least one continuous interval is below the cutoff value.

4. The hydraulic fracturing system of claim 3, wherein the cutoff value is determined based on a moving average.

5. The hydraulic fracturing system of claim 1, wherein the perforating tool comprises a jet-perforating tool.

6. The hydraulic fracturing system of claim 1, wherein the stress regime is categorized as a strike-slip stress regime or a thrust stress regime, wherein the strike-slip stress regime corresponds to creation of fractures having twists, and wherein the thrust stress regime corresponds to creation of fractures having a vertical component.

7. The hydraulic fracturing system of claim 1, wherein the stress regime is a normal regime corresponding to creation of fractures having a horizontal component.

8. A system, comprising:
    a perforation tool configured to perforate a casing of a well; and
    a non-transitory computer-readable medium comprising computer-executable instructions that cause a processor to:
        receive seismic data associated with a subterranean formation adjacent to the well configured to produce hydrocarbons;
        determine a plurality of geomechanical properties associated with a plurality of depths of the well based on the seismic data;
        categorize each of the plurality of depths into one of three classes based on the plurality of geomechanical properties, wherein a first class of the three classes is indicative of one or more conditions that facilitate creation of vertical fractures, wherein a second class of the three classes is indicative of one or more conditions that facilitate creation of twists in fractures, and wherein a third class of the three classes is indicative of one or more conditions that facilitate creation of horizontal fractures;
        classify at least one continuous interval of the plurality of depths as a critical net pay (CNP) region based on whether each depth of the at least one continuous interval is categorized as either one of two of the three classes; and
        determine a depth within the at least one continuous interval for the perforating tool to perforate the casing of the well.

9. The system of claim 8, wherein either one of the two of the three classes comprises the first class or the second class.

10. The system of claim 8, wherein the plurality of geomechanical properties comprise a minimum horizontal stress, a maximum horizontal stress, and an overburden stress.

11. The system of claim 8, wherein the computer-executable instructions cause the processor to assign a value to each of the three classes and determine a cutoff associated with the CNP region based on a moving average of the value to each of the three classes.

12. The system of claim 8, wherein the computer-executable instructions cause the processor to assign a value to each of the three classes and determine a cutoff associated with the CNP region based on a weighted average of the value to each of the three classes.

13. The system of claim 8, wherein each of the three classes is one of a normal stress regime, a strike-slip stress regime, or a thrust stress regime.

14. A method comprising:
receiving, via a processor, seismic data associated with a subterranean formation adjacent to a well configured to produce hydrocarbons;
determining, via the processor, a plurality of geomechanical properties associated with a plurality of depths of the well based on the seismic data;
categorizing, via the processor, each of the plurality of depths into one of three classes based on the plurality of geomechanical properties, wherein a first class of the three classes is indicative of one or more conditions that facilitate creation of vertical fractures, wherein a second class of the three classes is indicative of one or more conditions that facilitate creation of twists in fractures, and wherein a third class of the three classes is indicative of one or more conditions that facilitate creation of horizontal fractures;
classifying, via the processor, at least one continuous interval of the plurality of depths as a critical net pay (CNP) region based on whether each depth of the at least one continuous interval is categorized as either one of two of the three classes; and
sending, via the processor, a command to a perforating tool to perforate a casing of the well at a depth within the at least one continuous interval.

15. The method of claim 14, wherein the two of the three classes are associated with generating vertical fractures in the subterranean formation or twisting fractures in the subterranean formation.

16. The method of claim 14, wherein the perforation tool comprises a jet-perforating tool.

17. The method of claim 14, wherein the plurality of geomechanical properties comprise a minimum horizontal stress, a maximum horizontal stress, and an overburden stress.

18. The method of claim 14, wherein the subterranean formation corresponds to an active tectonic region.

19. The method of claim 14, wherein each of the three classes is one of a normal stress regime, a strike-slip stress regime, or a thrust stress regime.

20. The method of claim 14, comprising assigning a value to each of the three classes, and determining a cutoff associated with the CNP region based on an average of the value to each of the three classes.

* * * * *